(12) United States Patent
Inutake

(10) Patent No.: US 10,179,380 B2
(45) Date of Patent: Jan. 15, 2019

(54) TEMPORARY PLACEMENT DEVICE ABLE TO ADJUST ORIENTATION OF WORKPIECE

(71) Applicant: FANUC CORPORATION, Yamanashi (JP)

(72) Inventor: Hiroshi Inutake, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 3 days.

(21) Appl. No.: 15/333,667

(22) Filed: Oct. 25, 2016

(65) Prior Publication Data
US 2017/0120402 A1    May 4, 2017

(30) Foreign Application Priority Data

Oct. 28, 2015  (JP) ................................. 2015-211860

(51) Int. Cl.
| | |
|---|---|
| *B65G 47/252* | (2006.01) |
| *B23P 19/00* | (2006.01) |
| *B25J 19/02* | (2006.01) |
| *B25J 9/00* | (2006.01) |

(52) U.S. Cl.
CPC .......... *B23P 19/002* (2013.01); *B25J 9/0096* (2013.01); *B25J 19/023* (2013.01)

(58) Field of Classification Search
CPC ........ B23P 19/002; B25J 9/0096; B25J 19/23; B65G 47/24; B65G 47/29
USPC .................................. 414/754–784; 198/399
See application file for complete search history.

(56) References Cited

U.S. PATENT DOCUMENTS

| | | | | |
|---|---|---|---|---|
| 2,514,190 A | * | 7/1950 | Schlichter | B29D 30/005 164/412 |
| 3,589,532 A | | 6/1971 | Filkins | |
| 3,954,170 A | * | 5/1976 | Schlough | B65G 47/252 193/35 J |
| 4,103,883 A | * | 8/1978 | Shepherd | B23Q 7/165 269/289 MR |
| 4,712,974 A | * | 12/1987 | Kane | B65G 47/24 198/394 |
| 6,540,472 B2 | * | 4/2003 | Ewaschuk | B23Q 7/005 414/759 |
| 2001/0022931 A1 | | 9/2001 | Ewaschuk | |
| 2011/0192175 A1 | * | 8/2011 | Kuratani | F25C 1/08 62/72 |

(Continued)

FOREIGN PATENT DOCUMENTS

| | | |
|---|---|---|
| CN | 103723495 A | 4/2014 |
| CN | 203624507 U | 6/2014 |
| GB | 2063718 A | 6/1981 |

(Continued)

*Primary Examiner* — Lynn E Schwenning
(74) *Attorney, Agent, or Firm* — RatnerPrestia

(57) ABSTRACT

A temporary placement device comprises a carrying member having a carrying surface on which a workpiece is placed and a drive device driving the carrying member. The carrying member is formed to be deformable. The drive device includes a connecting member connected to a center part of the carrying member and moving in an up-down direction. The drive device moves the connecting member between a top end position where the carrying surface of the carrying member becomes flat and a bottom end position where the carrying surface becomes recessed downward.

6 Claims, 7 Drawing Sheets

(56) References Cited

U.S. PATENT DOCUMENTS

2014/0147240 A1* 5/2014 Noda .................... B25J 9/0018
414/751.1
2014/0154036 A1* 6/2014 Mattern ................ B25J 9/1612
414/729

FOREIGN PATENT DOCUMENTS

| JP | H0881041 A | 3/1996 |
| JP | 2001301953 A | 10/2001 |
| JP | 2010005722 A | 1/2010 |
| JP | 2012-245602 A | 12/2012 |
| JP | 2013094936 A | 5/2013 |
| JP | 2014008997 A | 1/2014 |
| JP | 2016112643 A | 6/2016 |

* cited by examiner

TEMPORARY PLACEMENT DEVICE ABLE TO ADJUST ORIENTATION OF WORKPIECE

BACKGROUND OF THE INVENTION

1. Field of the Invention

The present invention relates to a temporary placement device of a workpiece.

2. Description of the Related. Art

Known in the past has been a conveyor system for conveying a workpiece which uses a robot to convey the workpiece. Workpieces are sometimes arranged at a pallet or container in irregular postures or orientations. The work of conveying workpieces includes the work of aligning a workpiece bulk stacked on a pallet etc. at a predetermined position. It is also known to use a robot for the work of aligning the workpieces.

Japanese Patent Publication No. 2012-245602A discloses a part feed system able to align parts arranged in a bulk stacked state. This part feed system is disclosed as being provided with a means for arranging bulk stacked parts at predetermined postures and a temporary placement table at which parts are set for recognizing allocated parts. Further, this publication discloses recognizing the position and posture of a part placed on the temporary placement table by a 2D vision sensor and using the results of recognition by the 2D vision sensor as the basis to arrange the part on the temporary placement table by a robot.

SUMMARY OF THE INVENTION

When gripping workpieces bulk stacked on a pallet etc by a robot, the postures of the workpieces are uneven. For this reason, when using an end effector of a robot to grip a workpiece, the orientation of the workpiece sometimes does not become the desired orientation. That is, when using an end effector to grip a workpiece, the posture of the workpiece sometimes does not become constant. For example, when gripping a workpiece having a longitudinal direction, the longitudinal direction of the workpiece sometimes becomes parallel to the horizontal direction and sometimes become parallel to the vertical direction. Alternatively, the workpiece sometimes is gripped in a state slanted in longitudinal direction.

There is the work of aligning the orientation of the workpiece at the time of placement on the work table etc. so as to orient a workpiece picked up from a pallet in a predetermined direction. When aligning the orientation of a workpiece, it is necessary to adjust the orientation of the gripped workpiece. For example, when an end effector grips a workpiece with its longitudinal direction parallel to the vertical direction, the posture of the workpiece is sometimes changed so that the longitudinal direction of the workpiece is oriented in the horizontal direction and a predetermined direction.

The above Japanese Patent Publication No. 2012-245602A discloses to provide a temporary placement table and recognize the position and posture of a part by a plan view. Further, it discloses to apply shaking or other external force when it is hard to determine a part placed on the temporary placement table. This publication discloses to change the position and posture of a part by contact with a robot or by blowing compressed air etc., but does not disclose the specific structure of the device.

The temporary placement device of the present invention is a temporary placement device arranged at a workpiece feed system aligning workpieces using a robot and imaging device, comprising a carrying member having a carrying surface on which a workpiece is placed and a drive device arranged at an opposite side to the carrying surface and driving the carrying member. The carrying member is formed to be able to be deformed. The drive device includes a moving part being connected to a center part of the carrying member and moving in an up-down direction. The drive device moves a moving part between a top end position where the carrying surface of the carrying member becomes flat and a bottom end position where the carrying surface becomes a state recessed downward.

In the above invention, the drive device can include an air cylinder moving the moving part.

In the above invention, the drive device includes a servo motor moving the moving part.

In the above invention, the carrying member is configured by a sheet-shaped elastic member.

In the above invention, the carrying member is made of a fluororubber.

In the above invention, the carrying member includes two plate-shape members, the two plate-shape members are connected by a hinge so that the end parts face each other, and, when the moving part is arranged at the bottom end position, the carrying member is bent so that the cross-sectional shape along the direction where the two plate-shaped members are arranged becomes a V-shape.

DETAILED DESCRIPTION

Referring to FIG. 1 to FIG. 8, a temporary placement device in an embodiment will be explained. The temporary placement device of the present embodiment adjusts the orientation of a predetermined product or other workpiece. The temporary placement device of the present embodiment is used for a workpiece feed system aligning workpieces bulk stacked on a pallet, container, or other conveyor member.

Figure 1:
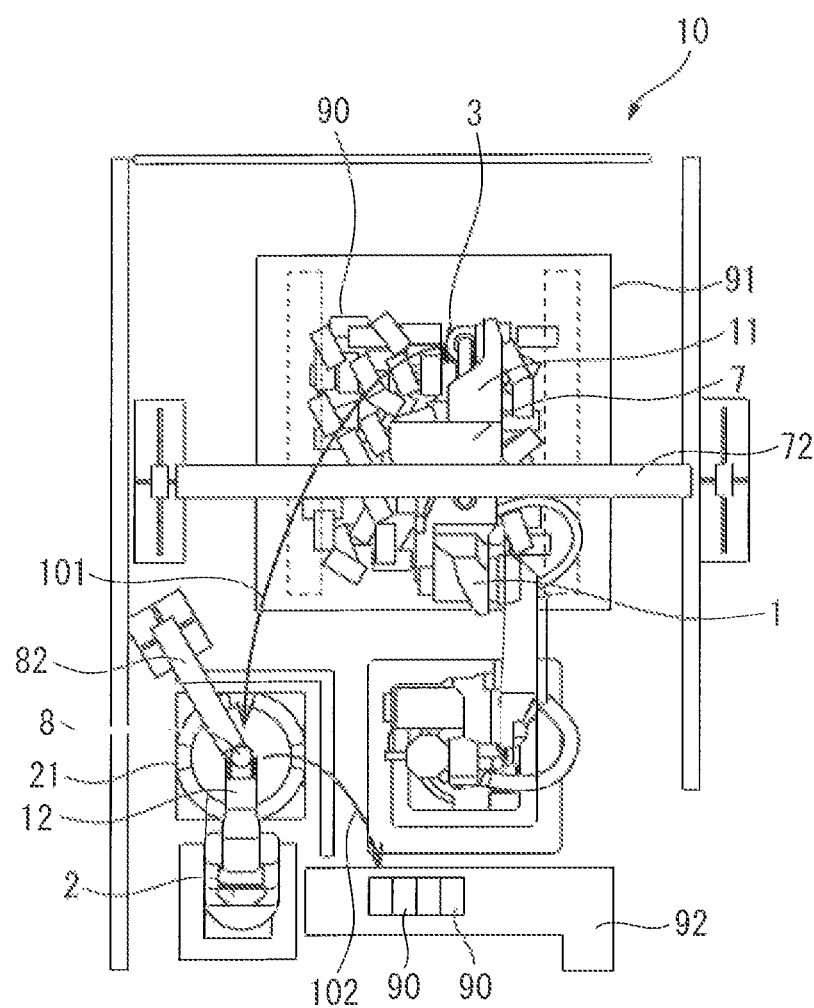
FIG. 1 is a schematic plan view of a workpiece feed system in an embodiment.

FIG. 1 shows a schematic view of a workpiece feed system of the present embodiment. The workpiece feed system 10 is provided with a first robot 1 and a second robot 2. The first robot 1 and the second robot 2 in the present embodiment are multi-articulated type robots.

At an arm 11 of the first robot 1, an end effector comprised of a magnet holder 3 is attached. The workpiece 90 of the present embodiment is formed by a magnetic member. The magnet holder 3 includes an electromagnet. If the electromagnet is energized, the magnet holder 3 can grip the workpiece 90 by magnetism. Further, the magnet holder 3 can release the workpiece 90 by the supply of current to the electromagnet being stopped.

At an arm 12 of the second robot 2, an end effector comprised of a hand 4 is attached. The hand 4 of the present embodiment includes a plurality of claws. The hand 4 can grip a workpiece 90 by the claws closing. Further, the hand 4 can release the workpiece 90 by the claws opening.

Note that, the end effector attached to the first robot 1 and the end effector attached to the second robot 2 may be any devices able to grip and release a workpiece 90.

The pallet of the conveyor member for conveying workpieces 90 has a plurality of workpieces 90 bulk stacked on it. That is, a plurality of workpieces 90 are stacked on the pallet 91 in a state where the positions and postures of the workpieces 90 are irregular. The workpieces 90 of the present embodiment has a longitudinal direction. The workpieces 90 of the present embodiment have rectangular parallelepiped shapes, but it is possible to employ any shapes of workpieces. Further, in the present embodiment, all of the workpieces 90 are the same shape, but the invention is not limited to this. A plurality of types of workpiece may also be mixed together.

The workpiece feed system 10 performs the work of restacking workpieces 90 so that the orientations of the workpieces 90 become constant. The first robot 1 conveys a workpiece 90 stacked on the pallet 91 to the temporary placement device 21 as shown by the arrow 101. Further, the temporary placement device 21 adjusts the posture of the workpiece 90. After this, the second robot 2 conveys the workpiece 90 to the carrying table 92 as shown by the arrow 102. The second robot 2 adjusts the orientation of the workpiece 90 and places it on the carrying table 92 so that the orientation of the workpiece 90 becomes predetermined direction. In the present embodiment, the workpiece 90 is aligned so that the longitudinal directions of the workpiece 90 become parallel to a predetermined direction.

Figure 2:
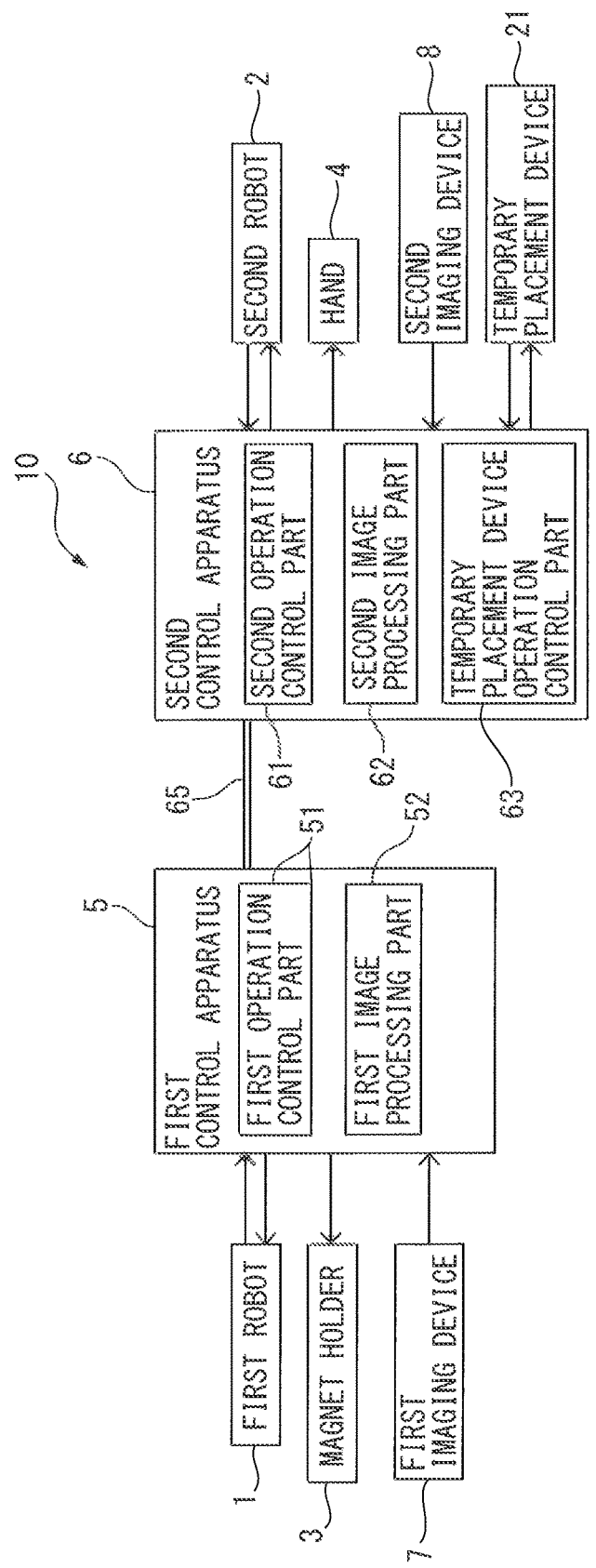
FIG. 2 is a block diagram of a workplace feed system in an embodiment.

FIG. 2 shows a block diagram of a workpiece feed system in the present embodiment. The workpiece feed system 10 includes a control apparatus for controlling the first robot 1, second robot 2, magnet holder 3, hand 4, and temporary placement device 21. The control apparatus of the present embodiment includes a first control apparatus 5 controlling the first robot 1 and magnet holder 3 and a second control apparatus 6 controlling the second robot 2, hand 4, and temporary placement device 21. These control apparatuses are comprised of arithmetic processing devices having components connected with each other through a bus such as a CPU (central processing unit), RAM (random access memory), and ROM (read only memory).

The first control apparatus 5 stores in advance operating programs relating to the operations of the first robot 1 and magnet holder 3. The first control apparatus 5 includes a first operation control part 51 controlling the operations of the first robot 1 and magnet holder 3. The first operation control part 51 uses the operating programs as the basis to drive the first robot 1 and magnet holder 3. The second control apparatus 6 stores in advance operating programs relating to the operations of the second robot 2, the temporary placement device 21, and hand 4. The second control apparatus 6 includes a second operation control part. 61 controlling the operations of the second robot 2 and hand 4 and a temporary placement device operation control part 63 controlling the operation of the temporary placement device 21. The second operation control part 61 uses the operating programs as the basis to drive the second robot 2 and hand 4. The temporary placement device operation control part 63 uses the operating programs as the basis to drive the temporary placement device 21.

The workpiece feed system 10 is provided with a communication device communicating between the first control apparatus 5 and the second control apparatus 6. The first control apparatus 5 and second control apparatus 6 are connected to a communication line 65 and are formed to be able to be connected with each other.

Note that, the control apparatus can employ any constitution enabling control of the workpiece feed system. For example, a third control apparatus may be arranged for control of the temporary placement device 21, and the third control apparatus may be connected to the first control apparatus and second control apparatus through a communication device.

Referring to FIG. 1 and FIG. 2, the workpiece feed system 10 is provided with a first imaging device detecting positions and postures of workpieces 90 stacked on the pallet 91. The first imaging device 7 is arranged above the center part when viewing the pallet 91 by a plan view. The first imaging device 7 is supported by a frame 72. The first imaging device 7 is arranged above the first robot 1. The first imaging device 7 of the present embodiment is a three-dimensional measuring device. The range of measurement of the first imaging device 7 is set so as to be able to capture images of all of the workpieces 90 stacked on the pallet 91.

As the three-dimensional measuring device, various non-contact types can be used. For example, a stereo type using two cameras, a type scanning by laser slit light, a type scanning by laser spot light, a type projecting patterns of light on a workpiece using a projector or other device, or other three-dimensional measuring devices can be used.

The first control apparatus 5 includes a first image processing part 52 processing the image captured by the first imaging device 7. The first image processing part 52 detects the exposed surfaces of workpieces 90 in the workpieces 90 stacked on the pallet to acquire position information of a plurality of three-dimensional points. That is, it acquires the positions and postures of the workpieces. The first image processing part 52 selects a workpiece 90 to be taken out. The first image processing part 52 sets the position and posture of the magnet holder 3 to be able to grip the workpiece 90. The first operation control part 51 controls the first robot 1 so that the magnet holder 3 becomes the set position and posture. Further, the magnet holder 3 grips the workpiece 90. After that, the first robot 1 conveys the workpiece 90 to the temporary placement device 21.

In the present embodiment, the magnet holder 3 is used to grip a workpiece 90. In this case, the workpiece 90 is held by the magnet holder 3 in various orientations. The magnet holder 3 not only picks up the workpiece 90 at the surface with the greatest area, but also sometimes picks up an end face. Alternatively, a plurality of workpieces 90 are sometimes picked up at one time by the magnet holder 3. In the present embodiment, the temporary placement device 21 adjusts the orientation of the workpiece 90 so that the longitudinal direction becomes parallel to the horizontal direction.

The workpiece feed system 10 is provided with a second imaging device 8 for detecting the position and orientation of the workpiece 90 placed at the temporary placement device 21. The second imaging device 8 is arranged above the center part of the carrying member 23 when viewing the temporary placement device 21 by a plan view. The second imaging device 8 is supported by a frame 82. The second imaging device 8 is arranged above the second robot 2.

The second imaging device 8 of the present embodiment is a two-dimensional measuring device. As the two-dimensional measuring device, it is possible to employ a non-contact type camera. The second imaging device 8 captures the image of the workpiece 90 placed at the temporary placement device 21. The second. Imaging device 8 is arranged at a position able to capture the image of the workpiece 90 placed at the temporary placement device 21. The second control apparatus 6 includes a second image processing part 62 processing the image captured by the second imaging device 8.

The second image processing part 62 acquires the contours of the surface of the workpiece 90. The second image processing part 62 detects the position and posture of the workpiece 90. The second operation control part 61 uses the detected position and posture of the workpiece 90 as the basis to control the position and posture of the second robot so that the hand 4 can grip the workpiece 90. The hand 4 is controlled in position and posture so as to correspond to the shape of workpiece 90. Further, the hand. 4 can grip the workpiece 90.

Next, the second robot 2 conveys the workplace 90 to the carrying table 92. At this time, it changes the orientation of the workpiece 90 so that the orientation of the workpiece 90 becomes a predetermined direction. At the carrying table 92, the workpiece 90 is arranged in a state with the orientation of the workpiece 90 aligned. For example, workpieces 90 are arranged at the carrying table 92 so that the longitudinal directions of the workplaces 90 become parallel to each other.

Figure 3:
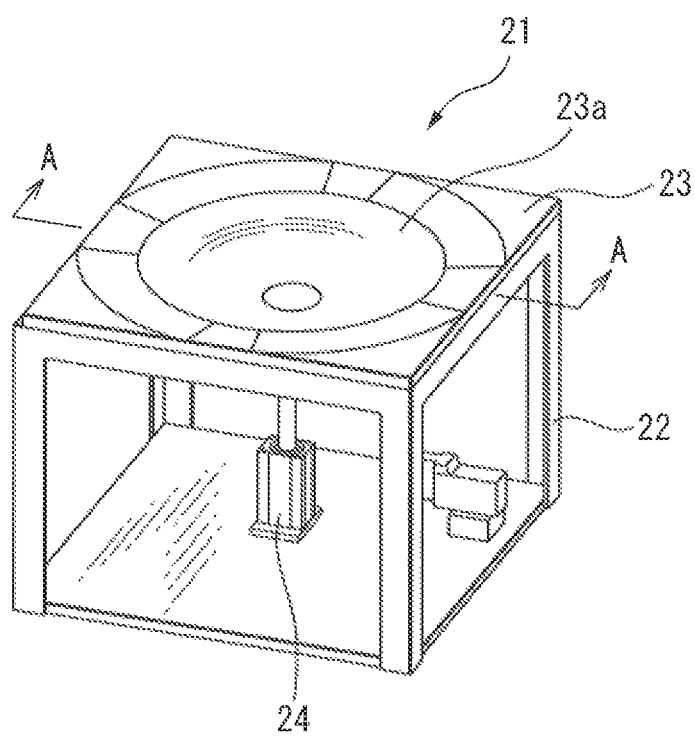
FIG. 3 is a perspective view of a first temporary placement device in an embodiment.
Figure 4:
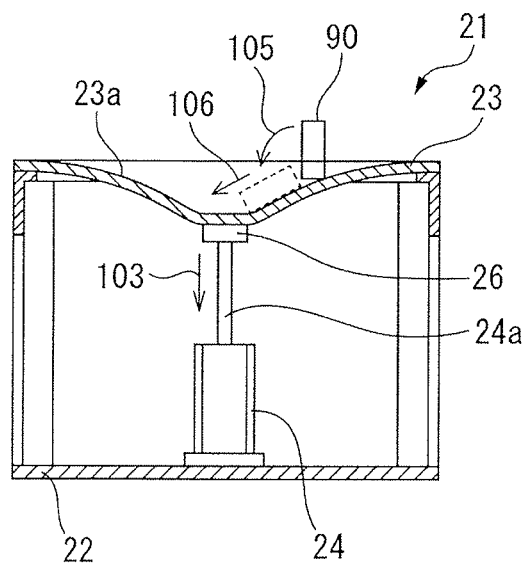
FIG. 4 is a schematic cross-sectional view of a first temporary placement device when the center part of the carrying member is recessed.

FIG. 3 shows a perspective view of a first temporary placement device in the present embodiment. FIG. 4 shows a schematic partial cross-sectional view of a first temporary placement device in the present embodiment. FIG. 4 is a partial cross-sectional view along the line A-A in FIG. 3. The first temporary placement device 21 is provided with a frame member 22 and a carrying member 23 arranged on the top surface of the frame member 22. The workpiece 90 is arranged at the carrying surface 23a of the to surface of the carrying member 23. The carrying member 23 is formed into a sheet shape. At the first temporary placement device 21, the carrying member 23 is formed by elastically deforming fluororubber. The carrying member 23 is fastened at its outer circumferential part with the frame member 22.

The temporary placement device 21 is provided with a drive device arranged at the opposite side to the carrying surface 23a and driving the carrying member 23. The drive device is controlled by the temporary placement device operation control part 63. The drive device includes a connecting member 26 as the moving part moving in the up-down direction and an air cylinder 24 moving the connecting member 26. The connecting member 26 of the present embodiment is formed into a disk shape. The connecting member 26 is fastened at the surface at the opposite side to the carrying surface 23a of the carrying member 23. The connecting member 26 is fastened to the center part when viewing the carrying member 23 from a plan view. The connecting member 26 is fastened to a shaft 23a of an air cylinder 24.

Figure 5:
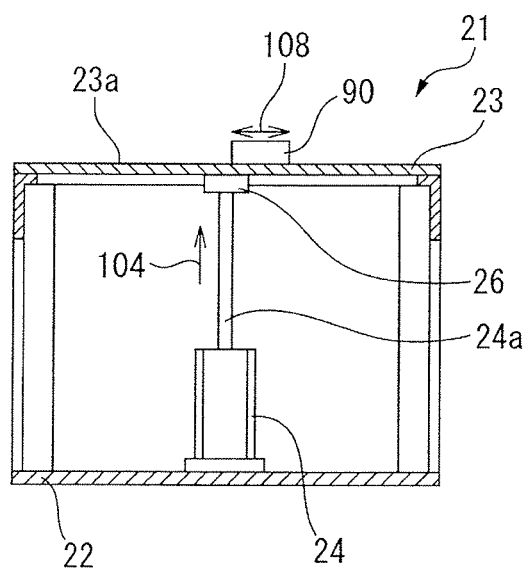
FIG. 5 is a schematic cross-sectional view of a first temporary placement device when the carrying surface of the carrying member is flat.

FIG. 5 shows another schematic partial cross-sectional view of a first temporary placement device in the present embodiment. Referring to FIG. 4 and FIG. 5, the temporary placement device operation control part 63 drives the air cylinder 24 to move the connecting member 26 in the up-down direction. FIG. 4 shows the state where the connecting member 26 moves downward as shown by the arrow 103 and is arranged at the bottom end position. The carrying member 23 is pulled by the connecting member 26. The carrying member 23 elastically deforms and become recessed at its center part. FIG. 5 shows the state where the connecting member 26 moves upward as shown by the arrow 104 and is arranged at the top end position. The carrying surface 23a of the carrying member 23 becomes a flat shape. In this way, the connecting member 26 can move back and forth between the top end position and bottom end position. The carrying member 23 deforms along with movement of the connecting member 26.

Referring to FIG. 4, the temporary placement device operation control part 63 makes it so that the connecting member 26 is arranged at the bottom end position when the first robot 1 conveys a workpiece 90 to the temporary placement device 21. When the magnet holder 3 releases the workpiece 90 and places the workpiece 90 at the carrying surface 23a, the longitudinal direction of the workpiece 90 sometimes becomes parallel to the vertical direction. Here, the carrying surface 23a is slanted about the connecting member 26. For this reason, the workpiece 90 is laid flat as shown by the arrow 105. Further, the workpiece 90 slides toward the center part of the carrying member 23 as shown by the arrow 106.

Referring to FIG. 5, after that, the temporary placement device operation control part 63 drives the air cylinder 24 and, moves the connecting member 26 to the top end position as shown by the arrow 104. The carrying surface 23a of the carrying member 23 becomes flat. The longitudinal direction of the workpiece 90 shown by the arrow 108 can be made a state parallel to the horizontal direction.

By placing the workpiece 90 at the carrying member 23 in a state with the center part recessed and then performing control to return the carrying surface 23a to a flat state in this way, it is possible to change the orientation of the workpiece 90 in the state with the longitudinal direction of the workpiece 90 becoming parallel to the horizontal direction. Further, it is possible to make the workpiece 90 move toward the center part of the carrying member 23, so the workpiece 90 can be arranged at the inside of the range of measurement of the second imaging device 8. The workpiece 90 can be kept from deviating from the measurement range of the second imaging device 8.

In this way, the temporary placement device 21 in the present embodiment can lay flat a workpiece 90 even if the workpiece 90 is placed on the carrying member 23 in a state standing up and can orient the workpiece 90 toward a predetermined direction. Further, even if the workpiece 90 is placed on the carrying member 23 in a state with its longitudinal direction slanted with respect to the vertical direction, the workpiece 90 can be similarly laid flat. When making the carrying surface 23a flat, the longitudinal direction of the workpiece 90 can be made parallel to the horizontal direction.

Further, even when using the first robot 1 to convey a plurality of workpieces 90, it is possible to lay flat the workpieces 90. Further, it is possible to gather the workpieces 90 at the center part of the carrying member 23 and place a plurality of workpieces 90 in the range of capture of the second imaging device.

The carrying member 23 in the present embodiment is comprised of a sheet-shaped elastic member. By employing this constitution, when moving the connecting member to the bottom end position, the center part of the carrying member 23 can be made recessed. Further, it is possible to form slanted surfaces around the center part. For this reason, at is possible to easily gather workpieces 90 at the center part of the carrying member 23.

As the sheet-shaped elastic member, one made of a fluororubber is preferable. A fluororubber is smooth at its surface, so a workpiece 90 can easily move on the carrying surface 23a. For this reason, the workpiece 90 easily moves to the center part. Furthermore, when using the first robot 1 to drop a workpiece 90 on the carrying member 23, it is possible to suppress the dropping noise of the workpiece 90. Further, a fluororubber is excellent in abrasion resistance, so can be used over a long period of time. Note that, the sheet-shaped elastic member is not limited to a fluororubber. Any material can be employed.

Figure 6:
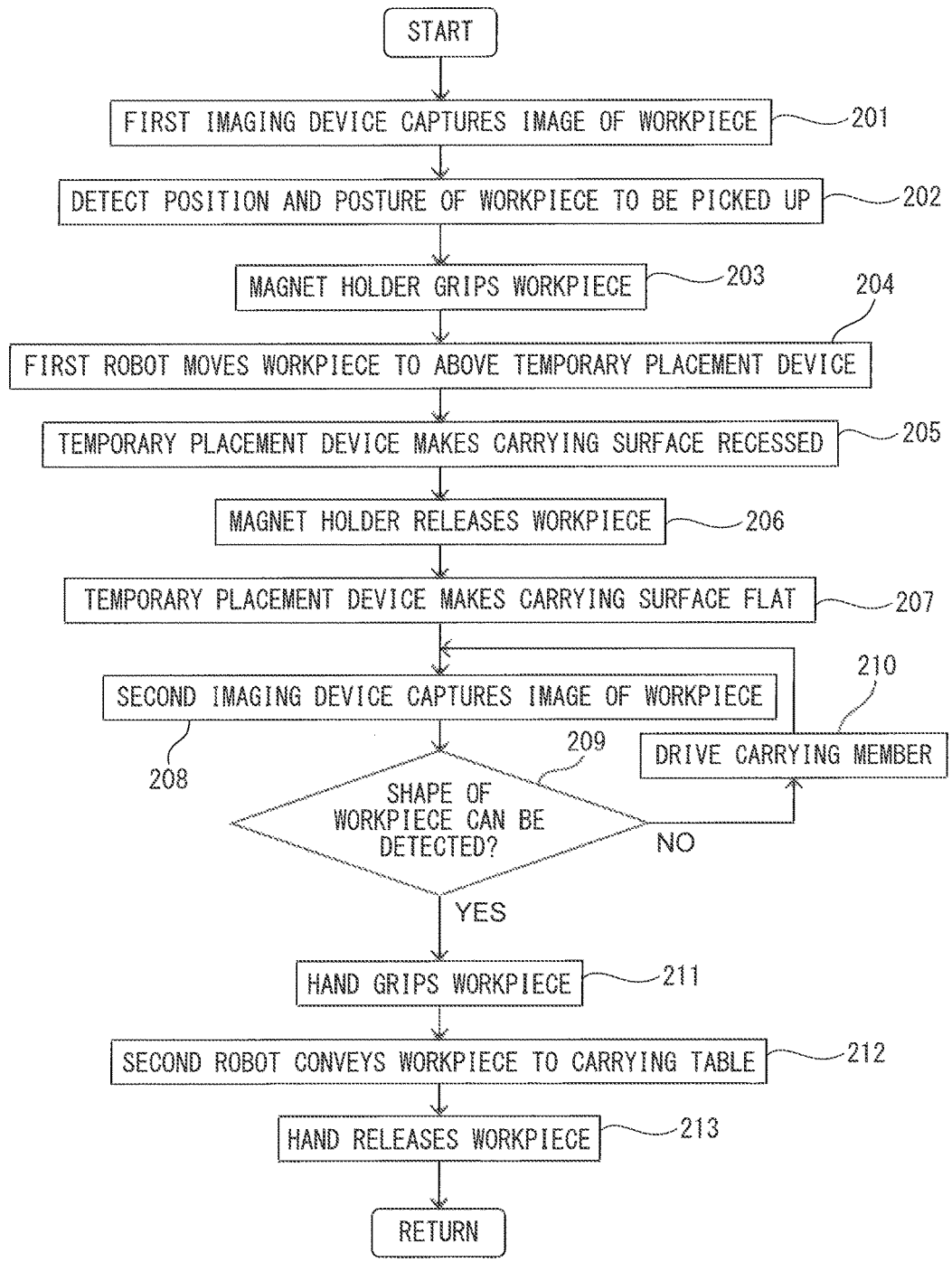
FIG. 6 is a flow chart of control of a workplace feed system in an embodiment.

FIG. 6 shows a flow chart of control of a workpiece feed system in the present embodiment. First, at step 201, the first imaging device 7 is used to capture an image of workpieces 90 stacked on a pallet 91. At step 202, the first image processing part 52 selects a workpiece to be taken out. Further, the first image processing part 52 detects the position and posture of the workpiece.

Next, at step 203, the first robot 1 moves the magnet holder 3 to a position where it can grip the workpiece 90. The magnet holder 3 grips the workpiece 90. At step 204, the first robot 1 moves the workpiece 90 to above the temporary placement device 21. In the present embodiment, the first robot 1 moves the workpiece 90 to above the center part of the carrying member 23.

At step 205, the temporary placement device operation control part 63 drives the carrying member 23 to make the carrying surface 23a recessed in state. That is, the air cylinder 24 moves the connecting member 26 to the bottom end position.

At step 206, the magnet holder 3 releases the workplace 90. The workpiece 90 is placed on the carrying surface 23a. In the present embodiment, the magnet holder 3 releases the workpiece 90 at a position a predetermined distance away from the carrying member 23. That is, control is performed to drop the workpiece 90 toward the carrying member 23. The workpiece 90 is laid flat by gravity when placed on the carrying member 23 in a standing state. Further, the workpiece 90 moves toward the center part when placed at a position of the carrying member 23 away from the center part. The first robot 1 releases the workpiece 90, then retracts from above the temporary placement device 21.

Note that, as the control for placing a workpiece 90 at the carrying surface 23a, it is also possible to use the first robot 1 to convey a workpiece 90 to a position where the workpiece 90 contacts the carrying surface 23a, then release the workplace 90.

After that, at step 207, the temporary placement device 21 returns the carrying surface 23a to a flat state. That is, the air cylinder 24 moves the connecting member 26 to the top end position. The workpiece 90 becomes parallel to the horizontal, direction in its longitudinal direction.

Next, at step 208, the second imaging device 8 is used to capture an image of the workplace 90. At step 209, the second image processing part 62 uses the image captured by the second imaging device 8 to judge whether or not the shape of the workpiece can be detected. That is, the second image processing part 62 judges whether or not it is possible to detect the position and orientation of the workpiece 90.

The second image processing part 62, for example, compares a model pattern stored in advance with the captured contour of the workpiece 90. Further, when the model pattern and the contour of the workpiece of the image do not match, it is judged that the shape of the workplace cannot be detected. For example, when the workpiece 90 stands up, the second imaging device 8 captures the image of the end face of the workpiece 90. This image differs from the model pattern of the shape of the side surface of the workpiece 90, so the second image processing part 62 judges that it is not possible to detect the shape of the workpiece.

At step 209, when the second image processing part. 62 cannot detect the shape of the workpiece 90, the routine proceeds to step 210. At step 210, the temporary placement device operation control part 63 again drives the carrying member 23. In the present embodiment, control is performed to make the carrying surface 23a a recessed state, then return it to a flat state. That is, the air cylinder 24 is returned to the top end position after moving the connecting member 26 to the bottom end position. By performing this control, if the workpiece 90 is standing up at the time when the carrying surface 23a is flat, it is possible to lay flat the workpiece 90. That is, it is possible to adjust the orientation of the workpiece 90 so that the longitudinal direction of the workpiece 90 becomes parallel to the horizontal direction when the carrying surface 23a becomes flat.

The driving operation of the carrying member 23 of step 210 is not limited to the above. It is also possible to repeat control for making the carrying surface 23a recessed and control for returning it to a flat state several times. Note that when it is not possible to detect the shape of a workpiece even if driving the carrying member a predetermined number of times, it is possible to perform control to stop the workpiece feed system. Alternatively, it is possible to perform control to use the first robot or the second robot to remove the workpiece from the temporary placement device.

When at step 209 the second image processing part 62 can detect the shape of the workpiece 90, the second image processing part 62 detects the position and orientation of the workpiece 90. Further, the routine proceeds to step 211.

At step 211, the second robot 2 moves the hand 4 based on the position and orientation of the workpiece. Further, the hand 4 holds the workpiece 90. At step 212, the second robot 2 conveys the workpiece 90 to a predetermined position of the carrying table 92. At that time, the second robot 2 adjusts the orientation of the workpiece 90 so that the orientation of the workpiece 90 becomes a predetermined orientation. Further, at step 213, the hand 4 releases the workpiece 90. The workpiece 90 is placed on the carrying table 92 by a desired orientation.

In this way, the workpiece feed system of the present embodiment takes out a bulk stacked workpiece and arranges it at a predetermined position in the state adjusting the orientation of the workpiece.

Figure 7:
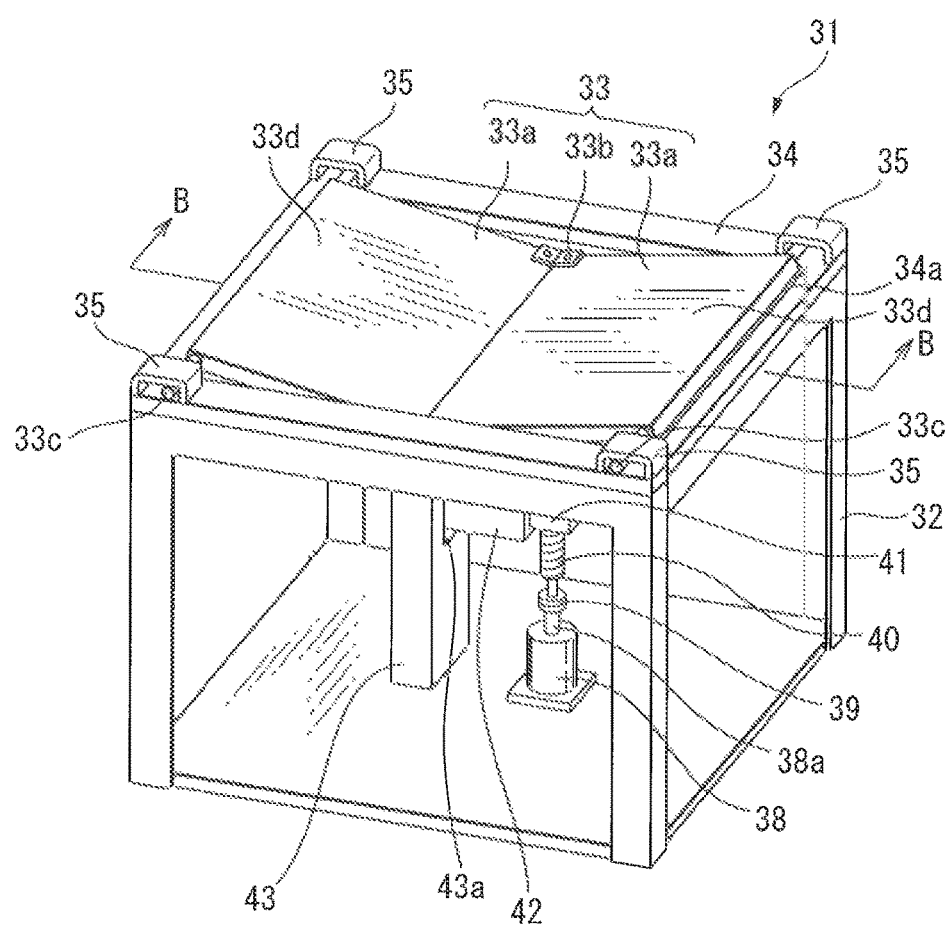
FIG. 7 is a perspective view of a second temporary placement device in an embodiment.
Figure 8:
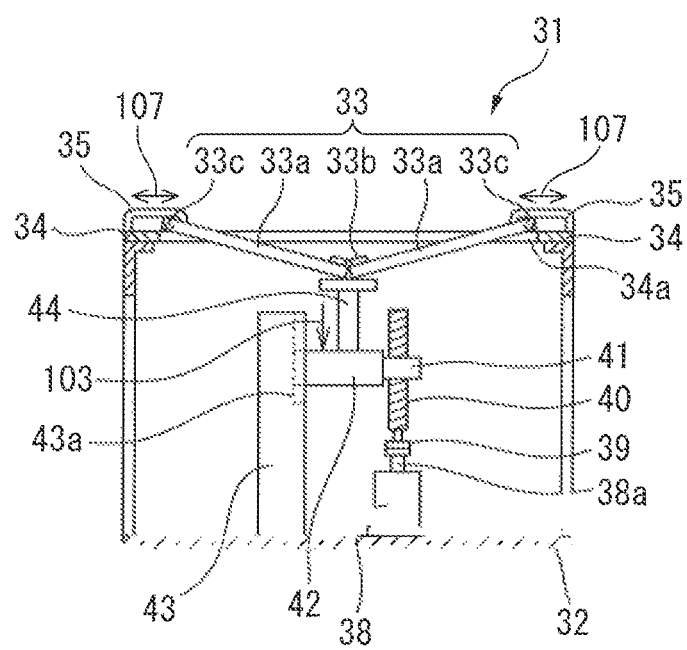
FIG. 8 is a schematic cross-sectional view of a second temporary placement device when the center part of the carrying member is recessed.

FIG. 7 shows a perspective view of the second temporary placement device in the present embodiment. FIG. 8 shows a schematic partial cross-sectional view of the second temporary placement device in the present embodiment. FIG. 8 is a partial cross-sectional view along the line B-B of FIG. 7.

Referring to FIG. 7 and FIG. 8, the second temporary placement device 31 includes a carrying member 33 on which a workpiece 90 is placed. The carrying member 33 includes two plate-shape members 33a and a hinge 33b connected to the two plate-shape members 33a. The plate-shape members 33a in the present embodiment are flat plates. The two plate-shape members 33a are arranged so that their end parts face each other. One of the end parts of the plate-shape member 33a is fastened to a hinge 33b. Further, at the side surface of the other end part of the plate-shape member 33a, a support part 33c is formed. The support part 33c is formed so as to project from the side surface. The support part 33c is formed in a columnar shape.

The second temporary placement device 31 includes a frame member 32 and a top plate 34 arranged at the top surface of the frame member 32. At the top plate 34, an opening part 34a is formed. The opening part 34a is formed to enable part of the plate-shape member 33a to be inserted. At the end part of the top plate 34, a guide member 35 is arranged. The guide member 35 is arranged so as to support the support part. 33c of the carrying member 33. The guide member 35 has a shape by which the support part 33c moves inside in the horizontal direction as shown by the arrow 107.

The drive device driving the carrying member 33 includes a pushing member 44. The pushing member 44 is arranged at an opposite side to the carrying surface 33d of the plate-shape member 33a. The pushing member 44 supports the end parts of the two plate-shape members 33a so that they face each other. The pushing member 44 is arranged at the substantial center part when viewing the carrying member 33 by a plan view. The pushing member 44 functions as the moving part connected to the center part of the carrying member 33 and moving in the up-down direction.

The drive device of the second temporary placement device 31 uses a ball-screw mechanism to move the pushing member 44. The pushing member 44 moves between the top end position and the bottom end position. The drive device driving the carrying member 33 includes a servo motor 38. The servo motor 38 is controlled by the temporary placement device operation control part 63. The output shaft 38a of the servo motor 38 is connected with the ball screw 40 through the coupling 39. The ball screw 40 is engaged with a nut 41. The slide member 42 is fastened to the nut 41.

The guide member 43 is fastened to the bottom plate of the frame member 32. The end part of the slide member 42 is inserted in the recessed part. 43a formed at the guide member 43. The slide member 42 moves along the direction of extension of the recessed part 43a. At the slide member 42, the pushing member 44 is fastened.

FIG. 7 and FIG. 8 show the state when the pushing member 44 moves to the bottom end position as shown by the arrow 103. The carrying surface 33d of the carrying member 33 is shaped recessed at the center part. When cutting the two plate-shape members 33a along the aligned direction, the carrying member 33 is bent so that the cross-sectional shape becomes a V-shape.

The temporary placement device operation control part 63 drives the servo motor 38 to make the nut 41 rise, whereby the slide member 42 and pushing member 44 rise. The pushing member 44 pushes the end parts where the two plate-shape members 33a face each other to move upward whereby the end parts of the two plate-shape members 33a move upward. The support part 33c of the carrying member 33 moves inside the guide member 35 toward the outside. Further, when the pushing member 44 reaches the top end position, the carrying surface 33d of the carrying member 33 becomes flat.

In the second temporary placement device 31 as well, it is possible to drive the carrying member 33 to switch between the state where the center part of the carrying surface 33d becomes recessed and the state where the carrying surface 33d becomes flat. In the second temporary placement device 31 as well, in the same way as the first temporary placement device 21, it is possible to lay flat a standing workpiece 90 by placing the workpiece 90 in the state with the carrying surface 33d at a slant. When the carrying surface 33d becomes flat, it is possible to adjust the orientation of the workpiece 90 so that the longitudinal direction becomes parallel to the horizontal direction. Further, the workpiece 90 can be made to move toward the center part. After that, it is possible to make the carrying surface 33d flat in state and use the second imaging device 8 to capture an image of the workpiece 90.

In this way, the carrying member may also be formed to be deformable by using a plurality of plate-shape members. Further, the carrying member is not limited to the above embodiments and may also be formed to be deformable so that the carrying surface is recessed downward. Further, as the drive device for driving the carrying member, it is possible to employ any drive source other than the air cylinder or servo motor. Further, when using a servo motor, the mechanism for making the moving part move is not limited to a ball-screw mechanism. Any mechanism may be employed. For example, as the mechanism for making the moving part move, a rack and pinion mechanism etc. may be employed.

According to the present invention, there is provided a temporary placement device able to adjust the orientation of the workpiece.

In the control of the embodiments, the order of the steps can be suitably changed in a range where the functions and actions are not changed. Further, the above embodiments can be suitably combined.

In the above figures, the same or equivalent parts are assigned the same reference notations. Note that, the above embodiments are illustrative and do not limit the invention. Further, in the embodiments, changes in the embodiments shown in the claims are included.

The invention claimed is:
1. A workpiece feed system, comprising:
a first robot conveying a workpiece;
a second robot conveying the workpiece;
a temporary placement device adjusting an orientation of the workpiece;
a control apparatus controlling the first robot, the second robot, and the temporary placement device;
wherein the temporary placement device includes:
 a carrying member having a carrying surface on which a workpiece is placed; and
 a drive device arranged below the carrying surface and driving the carrying member,
wherein
 the carrying member is formed to be able to be deformed,
 the drive device includes a moving part being connected to a center location of the carrying surface below the carrying surface and moving in an up-down direction and moves the moving part between a top end position where the center location of the carrying surface is pushed to a flat state and a bottom end position where the center location of the carrying surface is positioned to a recessed state, and
 the control apparatus performs a control in which the first robot releases the workpiece so as to place the workpiece on the carrying member when the moving part is in the bottom end portion, and a control in which the second robot picks up the workpiece arranged on the carrying member when the moving part is in the top end position after moving from the bottom end position to the top end position.
2. The workpiece feed system according to claim 1, wherein the drive device includes an air cylinder moving the moving part.

3. The workpiece feed system according to claim 1, wherein the drive device includes a servo motor moving the moving part.

4. The workpiece feed system according to claim 1, wherein the carrying member is configured by a flexible elastic member.

5. The workpiece feed system according to claim 4, wherein the carrying member is made of a fluororubber.

6. The workpiece feed system according to claim 1, wherein
   the carrying member includes two plate members,
   the two plate members are connected by a hinge so that the end parts face each other, and,
   when the moving part is arranged at the bottom end position, the carrying member is bent so that the cross-sectional shape along the direction where the two plate members are arranged becomes a V-shape.

\* \* \* \* \*